Dec. 16, 1952 C. C. HAAS 2,621,748
AGRICULTURAL IMPLEMENT
Filed Oct. 25, 1946 3 Sheets-Sheet 1

Inventor:
Clarence C. Haas.
By Paul O. Pippel
Atty

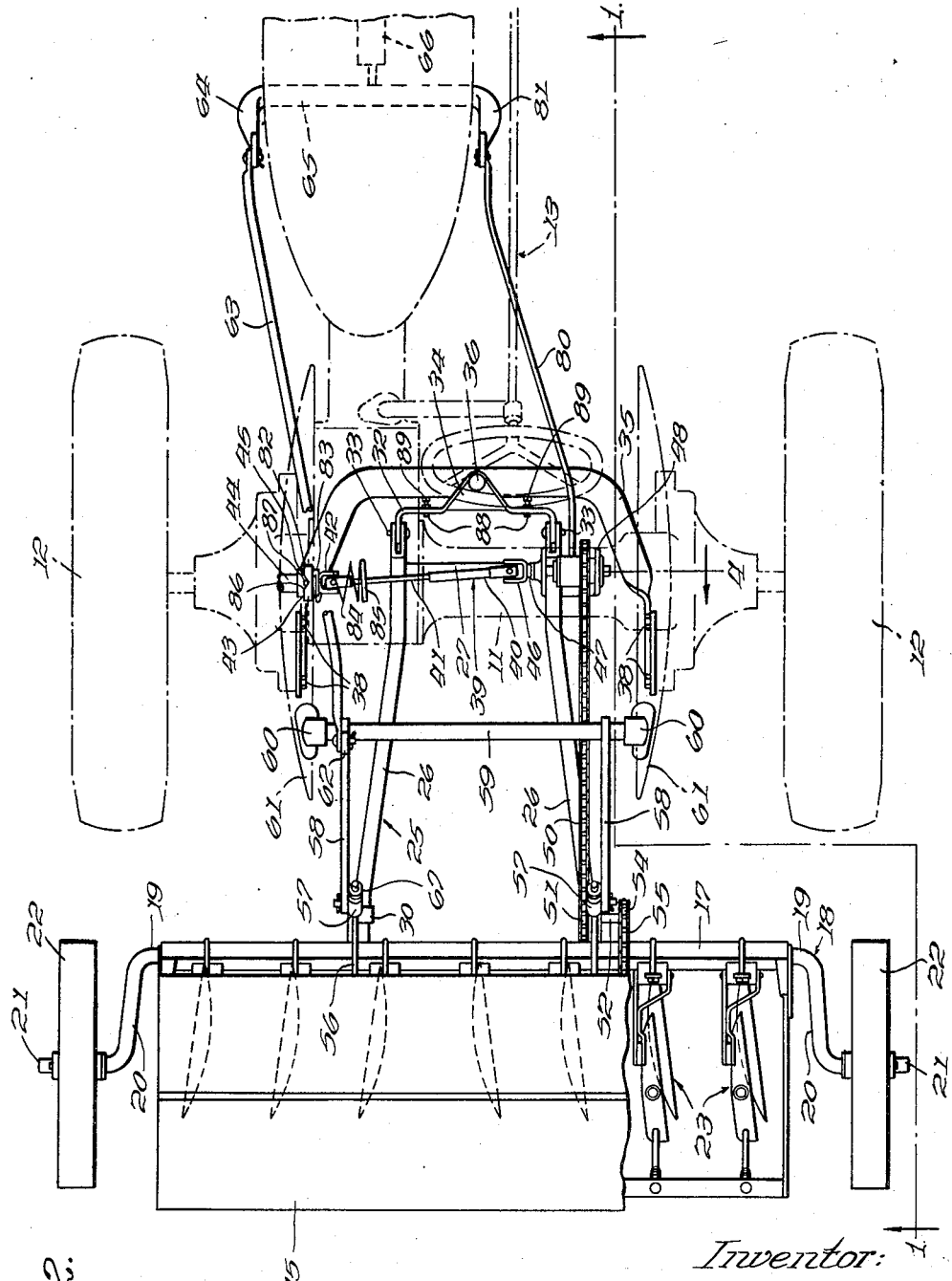

Dec. 16, 1952     C. C. HAAS     2,621,748
AGRICULTURAL IMPLEMENT
Filed Oct. 25, 1946     3 Sheets-Sheet 3
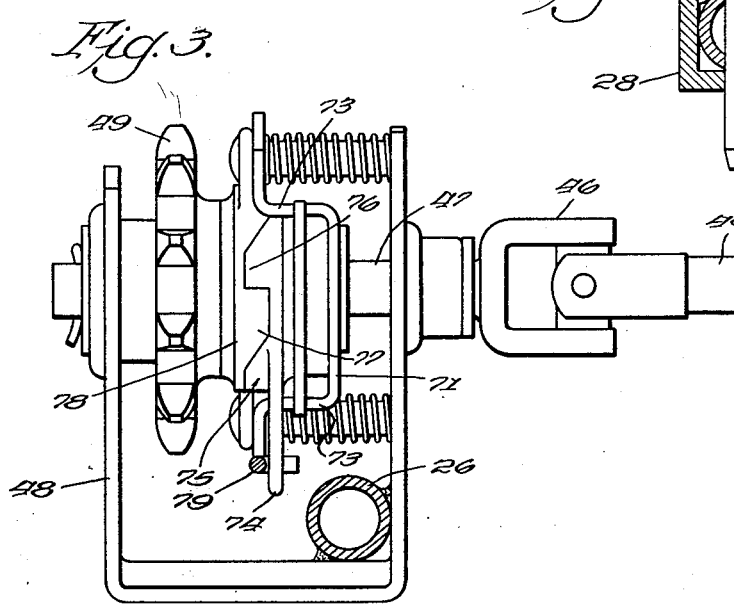
Inventor:
Clarence C. Haas.
By Paul O. Pippel
Atty.

Patented Dec. 16, 1952

2,621,748

UNITED STATES PATENT OFFICE 2,621,748

AGRICULTURAL IMPLEMENT

Clarence C. Haas, Richmond, Ind., assignor to International Harvester Company, a corporation of New Jersey Application October 25, 1946, Serial No. 705,709

7 Claims. (Cl. 180—14)

This invention relates to agricultural implements and particularly to a frame structure by which the implement is connected to a tractor.

An object of the invention is to provide a hitch or draw-frame for connecting an implement to a tractor and which may function as a hitch structure for use with other types of implements such as a corn planter.

Another object is to provide an improved hitch frame for a tractor-mounted implement by which the implement may be readily attached to and detached from the tractor and which functions as a support for a portion of the gearing by which drive is transmitted from the tractor to the grain dispensing mechanism.

A further object of the invention is to provide novel drive means for the operating parts of a tractor-mounted implement which maintains a constant driving connection between the tractor and the implement while accommodating relative movement of the tractor and the implement.

Another object of the invention is to provide an improved grain drill or the like adapted to be pivotally connected to a tractor for lateral swinging movement, and novel means for transmitting power from the tractor to drive the dispensing mechanism of the drill or other implement.

Other objects and advantages will become clear from the following detailed description when read in conjunction with the accompanying drawings, wherein:

Figure 2 is a plan view of the structure shown in Figure 1, the tractor being indicated in dotted lines to illustrate the attachment of the implement thereto;

Figure 3 is an enlarged detail of the drive transmission mechanism and throw-out mounted on the implement hitch structure;

Figure 4 is a section taken on the line 4 of Figure 2.

Figure 5 is a detail showing the connection of the hitch structure to the implement frame; and Figure 6 is a section on the line 6—6 of Figure 5.

Figure 1:
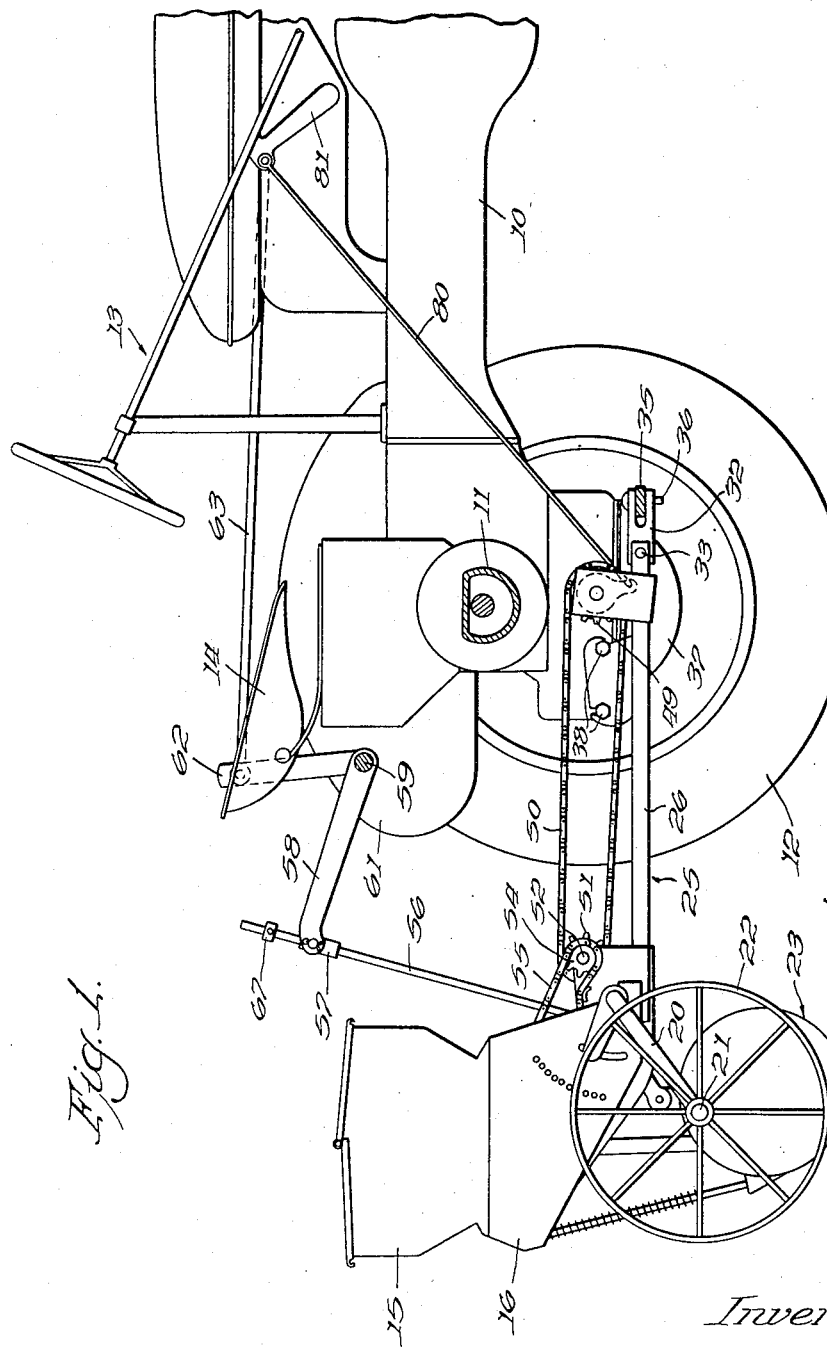
Figure 1 is a view in side elevation of the rear portion of a tractor with one wheel removed, showing a grain drill embodying the features of the present invention attached thereto and is a partial section taken on the line 1—1 of Figure 2.

Referring to the drawings, the hitch and planter drive structure of the present invention is illustrated in its application to a grain drill such as is shown and described in copending application Serial No. 705,630, filed October 25, 1946. The drill is mounted upon a tractor having a longitudinally extending laterally offset body 10, a rear axle structure 11 and laterally spaced rear drive wheels 12. The tractor is likewise provided with conventional steering mechanism 13 and an operator's station 14.

The grain drill is adapted to be directly connected to the tractor to be transported thereupon and comprises a transversely extending grain box 15 having at each end thereof a depending plate or frame piece 16. The plate 16 is generally triangular in shape and is secured at its forward lower end to a transversely extending hollow frame bar 17. The open ends of transverse frame bar 17 provide a bearing for the mounting of a crank axle 18 having a transverse portion 19 rotatably received in the bar, a downwardly and rearwardly extending portion 20, and a laterally extending portion 21 upon which is mounted a wheel 22.

The grain drill is provided with seed depositing mechanism generally indicated at 23 and is carried upon supporting wheels 22.

The hitch structure by which the grain drill is attached in draft receiving relation to the tractor comprises a U-shaped member generally indicated at 25 and comprising laterally spaced longitudinally extending tubular members 26. The members 26 converge forwardly and are braced near their forward ends by a cross-piece 27. The rear ends of the members 26 are each received in a socket member shown in Figure 5 and comprising a base portion 28 affixed to the transverse frame bar 17. Each of the members has secured thereto at longitudinally spaced locations sleeve or socket members 29 and 30 adapted to receive the rear end of the member 26. The rear socket member 29 as shown in section in Figure 6 is provided with an opening to receive a pin 31 adapted to register with a corresponding opening in the tubular member 26. The forward ends of the beams 26 are bifurcated to receive therebetween the rearwardly bent arms of a clevis 32. Each beam 26 is connected to the clevis by a pivot pin 33 providing a transverse axis for vertical swinging movement of the hitch structure. Clevis 32 forms a part of the hitch structure and extends transversely between the ends thereof. Forwardly extending lips 34 are provided on the clevis for connection to the draw-bar 35 of the tractor by means of a pivot pin 36. Draw-bar 35 is U-shaped and is connected to depending axle housings 37 of the tractor by bolts 38. The connection of the clevis 32 to the draw-bar 35 provides a vertical pivot to accommodate lateral swinging of the hitch structure 25 and therefore of the implement of which the hitch structure forms a part.

The grain drill of the present invention is provided with conventional seed plate mechanism by which material is deposited in the furrows formed by the opening disks. The seed plate mechanism is driven from the tractor by mechanism which includes a telescoping drive shaft 39 which comprises a sleeve member 40 and a shaft member 41. Shaft member 41 is connected by a universal joint 42 to a coupling member 43 affixed to a stub axle 44 of the tractor by means of a removable pin 45 passed through the coupling 43 and the axle 44. Stub axle 44 receives its power from the operation of the tractor wheels. Sleeve member 40 of the telescoping shaft 39 is connected by a universal joint 46 to a shaft 47 journaled upon a U-shaped bracket 48 secured to the right-hand beam 26 of the hitch structure 25.

Shaft 47 has mounted thereupon a sprocket wheel 49 which is connected by a chain 50 with a sprocket wheel 51 mounted upon a shaft 52 journaled on a bracket 53 affixed to transverse frame bar 17 of the grain drill. Shaft 52 is provided with an additional sprocket wheel 54 which is connected by a chain 55 and suitable gearing to drive the seed and fertilizer shafts, not shown, of the grain drill. It will thus be clear that drive is transmitted from the tractor to drive the dispensing mechanism of the implement through the stub axle 44 of the tractor, telescoping shaft 39, sprocket 49, and the chains 50 and 55. It will likewise be noted that the telescoping shaft 39 extends transversely of the tractor substantially in line with the axis of the tractor rear wheels and near the points of pivotal connection of the hitch structure 25 to the tractor, so that upon swinging of the implement horizontally or vertically about its pivots upon the tractor, drive may be transmitted from the tractor to the grain drill during such pivoting.

The grain drill is lifted upon the tractor for transport by means of lifting structure including a pair of laterally spaced rods 56 connected to the transverse frame bar 17. The upper end of each of the rods 56 is slidably received in a swivel member 57 pivotally mounted at the end of a lift arm 58. Each of the lift arms 58 extends rearwardly from the tractor and is secured at its forward end upon a rock-shaft 59, the ends of which are rotatably mounted in bearings 60 secured to fenders 61 of the tractor at opposite sides of the operator's station 14. A lever 62 is likewise fastened to the left-hand end of the rock-shaft 59 and is pivotally connected at its upper end by a connecting rod 63 with a rock-arm 64 mounted upon a rock-shaft 65 carried by the tractor body. Rock-shaft 65 is rocked by power derived from the tractor power plant and preferably through the intermediary of a hydraulic cylinder and piston unit indicated at 66. The upper end of each of the rods 56 is provided with an adjustable collar 67 which abuts the swivel 57 upon rocking the arm 64 to lift the grain drill and to accommodate a certain amount of floating movement of the implement in operating position.

Upon lifting the grain drill to transport position, it is not desirable that the seed and fertilizer distributing mechanisms continue to operate. A throw-out clutch is therefore provided and is shown in Figure 4. This throw-out clutch comprises a toothed member 68 splined to the shaft 47 and engageable with a toothed hub portion 69 of the sprocket wheel 49. Toothed member 68 is provided with a radially projecting shoulder portion 70, and mounted upon the member 68 on opposite sides of the shoulder portion 70 are collars 71 and 72. Collar 71 has laterally bent portions 73 engageable with the collar 72 and a projection 74 extending radially outwardly from a cam member 75 having teeth 76 therein engageable with teeth 77 of a stationary camming member 78. Rotation of the camming member 75 causes toothed clutch member 68 to move laterally away from the toothed portion 69 of the sprocket wheel 49. Rotation of the camming member 75 is accomplished by mechanism including an extension 79 on the portion 73 of collar 71 engageable with the projection 74 on the movable camming member 75. This extension 79 is connected by a link 80 with a rock-arm 81 secured to the right-hand end of the rock-shaft 66. Upon movement of the arm 81, therefore, motion is transmitted through the link 80 to rock the movable camming member 75 and disengage the clutch parts 68 and 69, thus interrupting the drive between the tractor and the moving parts of the grain drill. Since the arm 81 is affixed to the same rock-shaft as the rock arm 64, whenever the rock-shaft 65 is actuated to raise the grain drill to transport position upon the tractor, the arm 81 likewise is rocked in the same direction, and the link 80 by virtue of its connection to the throw-out clutch disengages the drive.

The hitch structure of the present invention is very readily connected to and disconnected from the tractor and facilitates the attachment and detachment of the entire implement. The implement may be disconnected by simply removing the pin 36 by which the clevis 32 is connected to the draw-bar of the tractor, then disconnecting the rods 56 and separating the telescoping parts 39, or by disconnecting the shaft 41 from the stub axle 44. This is accomplished by removing pin 45 which connects the coupling 43 with the stub axle. It will be noted in Figure 2 that the pin 45 is partially covered by a collar member 82 slidable axially thereupon. Collar 82 is provided with a reduced portion 83 to which is secured one end of a coil spring 84, the other end of which abuts against a collar 85 secured to the shaft 41 beyond the universal joint 42. The spring 84 thus bridges the universal joint 42 for a purpose which will hereafter become clear. The collar 82 is notched at 86 and engages a projection 87 on the coupling 43. Collar 82 is held against the projection 87 by the action of the coil spring 84. The notch 86 in the collar functions as a cam in engagement with the projection 87 of the coupling, and upon rotation of the collar the projection 87 will ride upon the outer rim thereof and the collar will back away from the pin 45 to accommodate its withdrawal.

The operator of the tractor then is able to drive away from the implement. As frequently happens, the operator in disconnecting the implement from the tractor fails to or does not wish to disconnect the portion 41 of the telescoping shaft from the stub axle, in which case he will drive off leaving the shaft portion 41 extending outwardly laterally from the stub axle. As long as the tractor is in operation and the wheels are moving, of course, the shaft 41 will continue to revolve. In such case, if, in the absence of the spring 84 shaft 41 should buckle with respect to stub shaft 44 and hang downward, considerable damage would be done to the tractor and to the shaft 41. However, the spring 84 extending to opposite sides of the universal joint 42 serves to prevent the shaft 41 from pivoting and holds it in a substantially horizontal position.

The telescoping shaft 39 and the universal joints 42 and 46 permit operation of the grain drill seed and fertilizer drive mechanism during pivoting of the implement about its connection to the tractor. The lateral swinging of the implement, however, is preferably limited, and this is accomplished by the provision of bolts 88 threaded for reception in threaded openings in the clevis 32 at opposite sides of the vertical pivot pin 36. The heads of these bolts are adapted to engage the draw-bar 35 upon the lateral swinging of the implement, and adjustment may be made therein by manipulating nuts 89.

It is believed that the operation of the grain drill and of the hitch structure of the present invention will be clearly understood from the foregoing description. Modifications may be made, however, in the arrangement and number of parts without departing from the spirit of the invention or the scope of the appended claims.

What is claimed is:

1. The combination with a tractor having a transverse rear axle, depending housings and stub axles in said housings carrying laterally spaced drive wheels, of an implement having a driven part, comprising a transverse frame structure, ground wheels carried by the frame, a draft structure extending between the tractor and the implement frame and secured to the latter at laterally spaced locations, a single hitch point on the tractor, means serving as a clevis pivotally connected to the tractor at said hitch point on a vertical axis for lateral swinging movement, means connecting the draft structure to the clevis at laterally spaced locations on horizontal pivots for vertical swinging movement, drive transmission means carried by the draft structure at a location approximately in line with the axis of one of said stub axles, means transmitting drive from said transmission means to the driven part on the implement, and an articulated shaft drivingly connecting said stub axle and said transmission means.

2. The combination with a tractor having a transverse rear axle, depending housings and stub axles in said housings carrying laterally spaced drive wheels, of an implement having a driven part, comprising a transverse frame structure, ground wheels carried by the frame, a draft structure extending between the tractor and the implement frame and secured to the latter at laterally spaced locations, a single hitch point on the tractor, means serving as a clevis pivotally connected to the tractor at said hitch point on a vertical axis for lateral swinging movement, means connecting the draft structure to the clevis at laterally spaced locations on horizontal pivots for vertical swinging movement, drive transmission means carried by the draft structure at a location approximately in line with the axis of one of said stub axles, means transmitting drive from said transmission means to the driven part on the implement, and a telescoping shaft universally connected at opposite ends to said stub axle and said transmission means.

3. The combination with a tractor having a transverse rear axle, depending housings and stub axles in said housings carrying laterally spaced drive wheels, of an implement having a driven part, comprising a transverse frame structure, ground wheels carried by the frame, a draft structure extending between the tractor and the implement frame and secured to the latter at laterally spaced locations, a single hitch point on the tractor, means serving as a clevis pivotally connected to the tractor at said hitch point on a vertical axis for lateral swinging movement, means connecting the draft structure to the clevis at laterally spaced locations on horizontal pivots for vertical swinging movement, drive transmission means carried by the draft structure at a location approximately in line with the axis of one of said stub axles, said transmission means comprising a driving element and a driven element, means transmitting drive from said driven element to the implement driven part, and a shaft adjacent said horizontal pivots universally connecting said stub axle and said driving element.

4. The combination with a tractor having a transverse rear axle, depending housings and stub axles in said housings carrying laterally spaced drive wheels, of an implement having a driven part, comprising a transverse frame structure, ground wheels carried by the frame, a draft structure extending between the tractor and the implement frame and secured to the latter at laterally spaced locations, a single hitch point on the tractor, means serving as a clevis pivotally connected to the tractor at said hitch point on a vertical axis for lateral swinging movement, means connecting the draft structure to the clevis at laterally spaced locations on horizontal pivots for vertical swinging movement, drive transmission means carried by the draft structure at a location approximately in line with the axis of one of said stub axles, said transmission means including a clutch comprising a driving element and a driven element, means transmitting drive from said driven element to the implement driven part, a shaft adjacent said horizontal pivots universally connecting said stub axle and said driving element, and means for disengaging said clutch.

5. The combination with a tractor having a transverse rear axle and rear drive wheels, of an implement having a driven part, comprising a transverse frame, supporting wheels on the frame, a draft structure on the frame, means pivotally connecting the draft structure to the tractor in draft-receiving relation thereto, a drive shaft on the tractor, means drivingly connecting said drive shaft to the implement driven part including separable, relatively slidable elements, a universal connection between one said element and the drive shaft, and a flexible connection between said element and said drive shaft adapted to accommodate pivoting of said element at its universal connection relative to said drive shaft during operation of the implement but to prevent buckling of the element upon separation thereof from the other slidable element.

6. The combination with a tractor having a transverse rear axle and rear drive wheels, of an implement having a driven part, comprising a transverse frame, supporting wheels on the frame, a draft structure on the frame, means pivotally connecting the draft structure to the tractor in draft-receiving relation thereto, a drive shaft on the tractor, means drivingly connecting said drive shaft to the implement driven part including separable, relatively slidable elements, a universal connection between one said element and the drive shaft, and a spring connecting the drive shaft and said element and arranged to accommodate pivoting of the latter at its universal connection during operation of the implement but to prevent buckling of the element upon separation thereof from the other slidable element.

7. The combination with a tractor having a transverse rear axle and rear drive wheels, of an implement having a frame and a driven part thereon, a draft structure secured to the frame and having hitch means thereon for pivotal connection to a tractor, and means for driving the driven part from the tractor comprising a transverse shaft on the tractor driven therefrom, a bracket on the draft structure in general alinement with said shaft, drive transmission means including a clutch carried by the bracket and drivingly connected to the driven part, a separable driving connection between said transmission means and said tractor shaft including a shaft and a pivotal connection between the latter shaft and the tractor shaft, and a spring enclosing said pivotal connection and having its ends secured to said shafts to prevent pivoting thereof upon separation of said driving connection.

CLARENCE C. HAAS.

REFERENCES CITED

The following references are of record in the file of this patent:

UNITED STATES PATENTS

| Number    | Name         | Date          |
|-----------|--------------|---------------|
| 1,264,153 | Burgess      | Apr. 30, 1918 |
| 1,475,455 | Skinner et al. | Nov. 27, 1923 |
| 1,640,642 | Brown        | Aug. 30, 1927 |
| 1,661,737 | Raimer       | Mar. 6, 1928  |
| 1,827,070 | Coultas et al. | Oct. 13, 1931 |
| 1,864,122 | Cole         | June 22, 1932 |
| 1,898,114 | Zink         | Feb. 21, 1933 |
| 1,967,326 | Raney et al. | July 24, 1934 |
| 1,999,841 | MacGregor    | Apr. 30, 1935 |
| 2,092,589 | Scarlett     | Sept. 7, 1937 |
| 2,269,897 | Raney et al. | Jan. 13, 1942 |
| 2,332,713 | Hand         | Oct. 26, 1943 |
| 2,332,743 | Morris       | Oct. 26, 1943 |
| 2,339,689 | Englund      | Jan. 18, 1944 |
| 2,346,330 | Ratcliff     | Apr. 11, 1944 |
| 2,383,182 | Evans et al. | Aug. 21, 1945 |
| 2,404,362 | Carlson      | Jan. 23, 1946 |